United States Patent
Yamaji et al.

(10) Patent No.: US 8,878,902 B2
(45) Date of Patent: Nov. 4, 2014

(54) STEREOSCOPIC IMAGE DISPLAY CONTROL APPARATUS, AND METHOD AND PROGRAM FOR CONTROLLING OPERATION OF SAME

(75) Inventors: Kei Yamaji, Tokyo (JP); Atsushi Misawa, Tokyo (JP); Shuji Ono, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 671 days.

(21) Appl. No.: 13/213,185

(22) Filed: Aug. 19, 2011

(65) Prior Publication Data
US 2012/0075292 A1   Mar. 29, 2012

(30) Foreign Application Priority Data
Sep. 27, 2010   (JP) .................................. 2010-214723

(51) Int. Cl.
G06T 15/00   (2011.01)
G06T 11/60   (2006.01)

(52) U.S. Cl.
CPC ..................................... *G06T 11/60* (2013.01)
USPC .......................................................... 348/46

(58) Field of Classification Search
CPC ..................... G11B 2220/2562; G11B 27/105; H04N 5/85; H04N 9/8205
See application file for complete search history.

(56) References Cited

U.S. PATENT DOCUMENTS

2005/0089212 A1*   4/2005   Mashitani et al. ............. 382/154
2010/0039504 A1    2/2010   Takahashi et al.

FOREIGN PATENT DOCUMENTS

| JP | 04-035491 | 2/1992 |
| JP | 2002-123842 | 4/2002 |
| JP | 2004-193795 | 7/2004 |
| JP | 2006-107213 | 4/2006 |
| JP | 2008-167066 | 7/2008 |
| JP | 4259913 | 4/2009 |
| JP | 2009223764 | 10/2009 |
| JP | 2010045584 | 2/2010 |

OTHER PUBLICATIONS

Japanese Official Action—2010-214723—Jun. 12, 2013.

* cited by examiner

*Primary Examiner* — Huy T Nguyen
(74) *Attorney, Agent, or Firm* — Young & Thompson

(57) ABSTRACT

It is so arranged that margins will not be produced in an image compositing area. Specifically, a user sets an amount of parallax. A stereoscopic image is displayed in an image compositing area and the stereoscopic image is adjusted to as to take on the set amount of parallax. It is determined whether margins will be produced within the image compositing area owing to the adjustment of amount of parallax. If margins will be produced, the stereoscopic image is enlarged in size to such an extent that margins will not be produced.

8 Claims, 15 Drawing Sheets

LEFT-EYE IMAGE

RIGHT-EYE IMAGE

AMOUNT OF PARALLAX ENLARGED

AMOUNT OF PARALLAX ENLARGED FURTHER

STEREOSCOPIC IMAGE DISPLAY CONTROL APPARATUS, AND METHOD AND PROGRAM FOR CONTROLLING OPERATION OF SAME

BACKGROUND OF THE INVENTION

1. Field of the Invention

This invention relates to a stereoscopic image display control apparatus and to a method and program for controlling the operation of this apparatus.

2. Description of the Related Art

There is a technique in which a layout is decided automatically when an electronic album is created utilizing a computer (see Japanese Patent Application Laid-Open No. 2009-223764). Further, since the amount of stereoscopic pop-up (depth perception) of a stereoscopic image is not uniquely decided when a stereoscopic image is displayed, there is a technique for adjusting the amount of pop-up (see Japanese Patent Application Laid-Open No. 2010-45584). Since the amount of pop-up varies depending upon enlargement and reduction of image size, there is a technique for determining whether a changed amount of pop-up falls within parallax limits (see Japanese Patent No. 4259913).

There is a presumption that the images pasted into an electronic album are two-dimensional images. No consideration has been given to the pasting of stereoscopic images in such an album.

SUMMARY OF THE INVENTION

A stereoscopic image display control apparatus according to the present invention comprises: a selecting device (selecting means) for selecting a stereoscopic image to be pasted in a pasting area that has been formed in a template; a pasting device (pasting means) for pasting at least part of a superimposed image portion, which is obtained by superimposing a left-eye image and a right-eye image that constitute the stereoscopic image that has been selected by the selecting device, in the pasting area so as not to protrude from the pasting area; a parallax-amount setting device (parallax-amount setting means) for setting a parallax amount of the stereoscopic image; a parallax-amount adjusting device (parallax-amount adjusting means) for adjusting the parallax amount of the stereoscopic image, which has been pasted in the pasting area by the pasting device, to the parallax amount set by the parallax-amount setting device; a determination device (determination means) for determining whether margins will be produced in the pasting area owing to adjustment of the parallax amount by the parallax-amount adjusting device; and a display control device (display control means) for controlling a display unit so as to enlarge the stereoscopic image in size and display the stereoscopic image inside the pasting area in response to a determination by said determination device that margins will be produced in the pasting area.

The present invention also provides an operation control method suited to the above-described stereoscopic image display control apparatus. Specifically, the present invention provides a method of controlling operation of a stereoscopic image display control apparatus, comprising the steps of: selecting a stereoscopic image to be pasted in a pasting area that has been formed in a template; pasting at least part of a superimposed image portion, which is obtained by superimposing a left-eye image and a right-eye image that constitute the stereoscopic image that has been selected, in the pasting area so as not to protrude from the pasting area; setting a parallax amount of the stereoscopic image; adjusting the parallax amount of the stereoscopic image, which has been pasted in the pasting area, to the parallax amount that has been set; determining whether margins will be produced in the pasting area owing to adjustment of the parallax amount; and controlling a display unit so as to enlarge the stereoscopic image in size and display the stereoscopic image inside the pasting area in response to a determination that margins will be produced in the pasting area.

The present invention further provides a computer-readable program for implementing the above-described method of controlling operation of a stereoscopic image display control apparatus. It may also be arranged to provide a recording medium on which this program has been stored.

In accordance with the present invention, a stereoscopic image to be pasted in a pasting area that has been formed in a template is selected. A superimposed image portion, which is obtained by superimposing a left-eye image and a right-eye image that constitute the selected stereoscopic image, is pasted in the pasting area so as not to protrude from the pasting area. The amount of parallax of the stereoscopic image is set and the stereoscopic image that has been pasted in the pasting area is adjusted to the set amount of parallax. If margins are produced in the pasting area owing to the adjustment of the amount of parallax, the stereoscopic image is enlarged in size. The stereoscopic image thus enlarged is displayed in the pasting area. Although the stereoscopic image is enlarged in size if margins will be produced in the pasting area owing to adjustment of amount of parallax, a portion that protrudes from the pasting area is not displayed. This makes it possible to prevent the layout of the template from changing.

In a case where an amount of parallax has been defined for the pasting area, the selecting device selects, by way of example, a stereoscopic image having a parallax amount within a fixed range of the parallax amount that has been defined for the pasting area.

The parallax amount of a stereoscopic image for which a parallax amount has not been defined is made a parallax amount of a stereoscopic image having the most recent capture date and time or a parallax amount of a stereoscopic image having the closest resembling composition from among stereoscopic images for which parallax amounts have been defined.

The template is a plurality of pages constituting an electronic album. In this case, the parallax-amount setting device sets a parallax amount on a page-by-page basis, by way of example. Further, the parallax-amount setting device sets a parallax amount in such a manner that the parallax amount of stereoscopic images increases as pages transition from pages of a first half to pages of a latter half.

In a case where a plurality of graphs representing relationships between pages and amounts of parallax have been stored, the parallax-amount setting device sets a parallax amount by selecting one graph from among the plurality of graphs.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will be described in detail with reference to the drawings.

Figure 1:
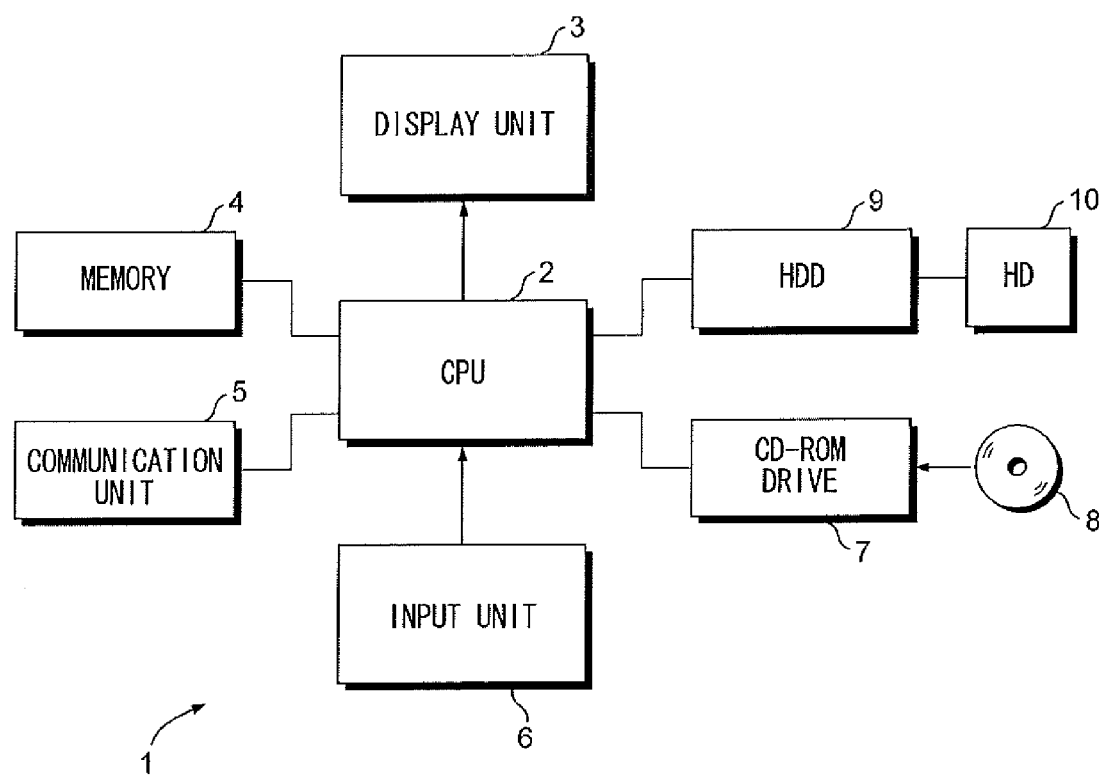
FIG. 1 is a block diagram illustrating the electrical configuration of a personal computer.

FIG. 1 is a block diagram illustrating the electrical configuration of a personal computer 1 according to an embodiment of the present invention. In this embodiment, the personal computer 1 communicates with a server computer (not shown) via the Internet. While communicating with the server computer, the user creates an electronic album using the personal computer 1. Naturally, the user may generate an electronic album without communicating with the server computer and is also capable of generating an electronic album utilizing a store terminal, which has been installed at a supermarket or convenience store, etc., without using the personal computer 1. In this case, the store terminal would have the electrical configuration shown in FIG. 1.

The overall operation of the personal computer 1 is controlled by a CPU 2.

The personal computer 1 includes a display unit 3, a memory 4, a communication unit 5 for communicating with a server computer, and an input unit 6 such as a keyboard and mouse. The personal computer 1 includes a hard disk 10 on which data such as image data representing a number of images has been recorded, and a hard-disk drive 9 for accessing the hard disk 10. The personal computer 1 further includes a CD-ROM drive 7 that accesses a CD-ROM 8 in which has been stored a program for controlling operation described below. The program that has been stored in the CD-ROM 8 is read by the CD-ROM drive 7 and the read program is installed in the personal computer 1, thereby allowing the personal computer 1 to operate in the manner described below. Naturally, it may be so arranged that even if the operation program is not stored on a recording medium such as the CD-ROM 8 removably inserted into the personal computer 1, the program can still be downloaded to the personal computer 1 via a network and installed in the personal computer 1.

Figure 2:
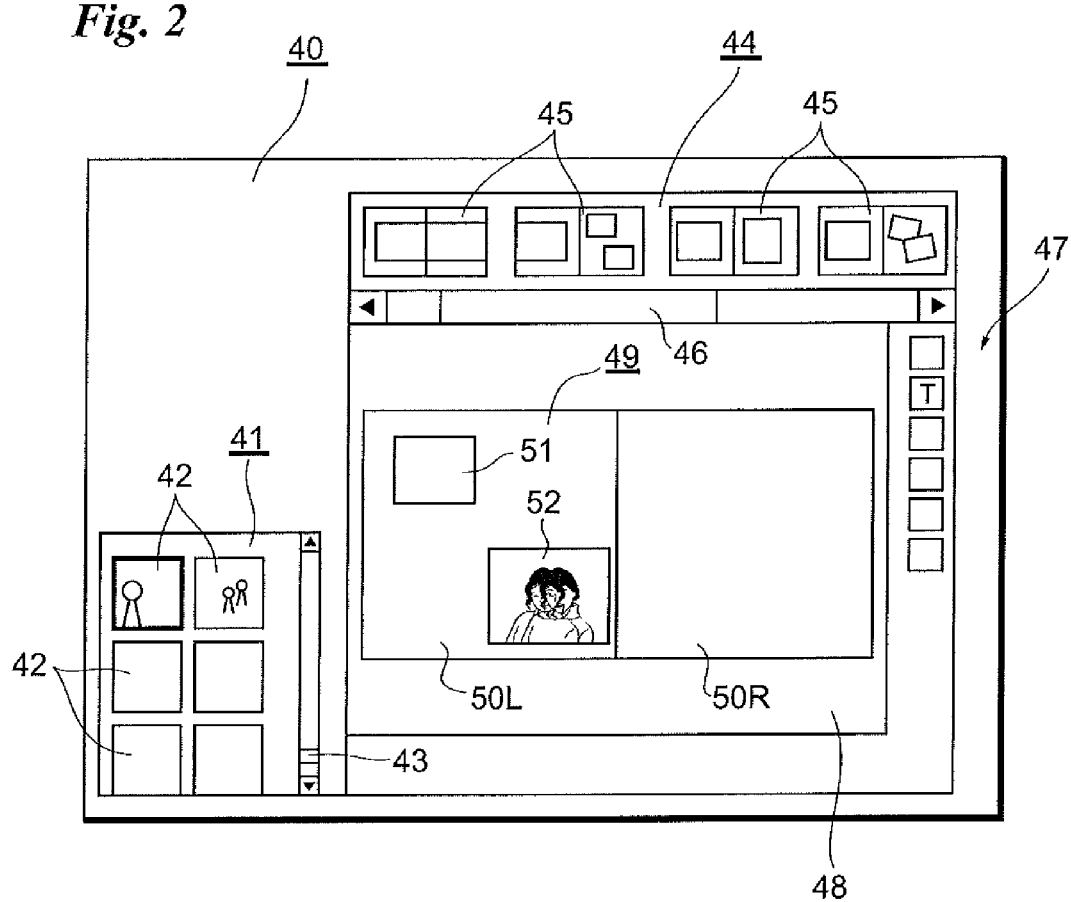
FIG. 2 is an example of a window for editing an electronic album.

FIG. 2 is an example of a window 40 for editing the electronic album.

Although processing for generating the electronic album will be described below, it will be assumed here that the personal computer 1 has already been connected to a server computer and that the electronic-album editing window 40 shown in FIG. 2 is being displayed on the display screen of the display unit 3 of the personal computer 1.

Formed at the lower-left portion of the editing window 40 is an image display area 41 in which images 42 to be pasted into the electronic album are displayed. The images (user images) 42 being displayed in the image display area 41 are represented by image data that has been stored on the hard disk 10. In a case where the electronic album is created using a store terminal, it goes without saying that the user brings a recording medium such as a memory card on which the image data has been recorded, reads the image data from the recording medium and displays the images, which are represented by the read image data, in the image display area 41. In such case the store terminal is provided with a memory card reader. A scroll button 43 is formed on the right side of the image display area 41. The scroll button 43 is moved freely up and down by a cursor (not shown). By moving the scroll button 43 up or down by the cursor, images that do not appear in the image display area 41 come into view in the image display area 41.

In this embodiment, stereoscopic images can be displayed in the electronic album, as will be described later in detail. The images 42 being displayed in the image display area 41 also are stereoscopic images.

Formed at the upper portion of the editing window 40 is a page display area 44 in which images 45 of pages (templates) constituting an electronic album are displayed. A scroll button 46 is formed beneath the page display area 44. The scroll button 46 also is freely movable to the left and right by a cursor (not shown). By moving the scroll button 46 to the left or right using the cursor, the images of pages that do not appear in the page display area 44 come into view in the page display area 44.

The editing area 48, which is for editing the pages that constitute the electronic album, is formed substantially over the entirety of the editing window 40. If the image of a desired page is selected (as by drag and drop) from among the images of the pages being displayed in the page display area 44, the image 49 of the selected page will be displayed in the editing area 48. Rectangular image compositing areas (pasting areas) 51 and 52 (though they need not necessarily be rectangular) are defined in a left-side page 50L of the image 49 of the selected pages. It goes without saying that image compositing areas may or may not be defined in a right-side page 50R of the image 49 of the selected pages. Images constituting the electronic album are pasted in these image compositing areas 51 and 52. For example, pasting of a desired image in the desired image compositing area 52 from among the images 42 being displayed in the image display area 41 is achieved by dragging and dropping the desired image in this image compositing area 52. Formed on the right side of the editing window 40 are editing buttons 47 for adjusting amount of parallax, synthesizing text, deleting images and subjecting images to a color conversion.

Figure 3A:
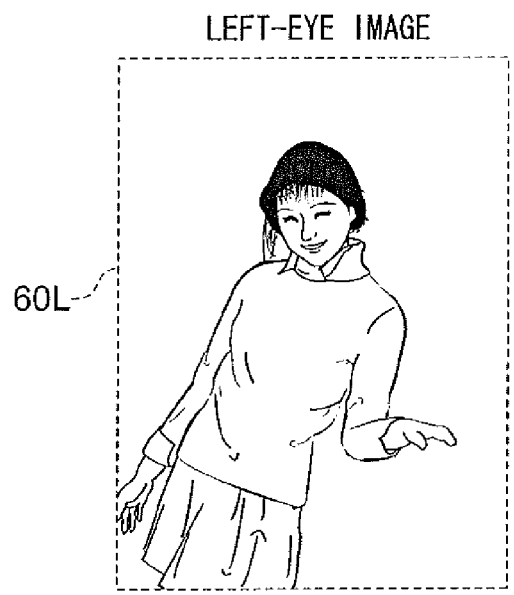
FIGS. 3A and 3B illustrate a left-eye image and a right-eye image, respectively.
Figure 3B:

FIG. 3A illustrates a rectangular left-eye image 60L and FIG. 3B illustrates a rectangular right-eye image 60R.

In a case where a stereoscopic image is displayed, the left-eye image 60L, which is observed by the left eye of the observer, and the right-eye image 60R, which is observed by the right eye of the observer, are required. In this embodiment, therefore, the left-eye image 60L and right-eye image 60R have been stored beforehand as the images desired to be displayed in the form of a stereoscopic image in the image compositing areas 51, 52, etc. The left-eye image 60L and right-eye image 60R need not necessarily be rectangular.

Figure 4:
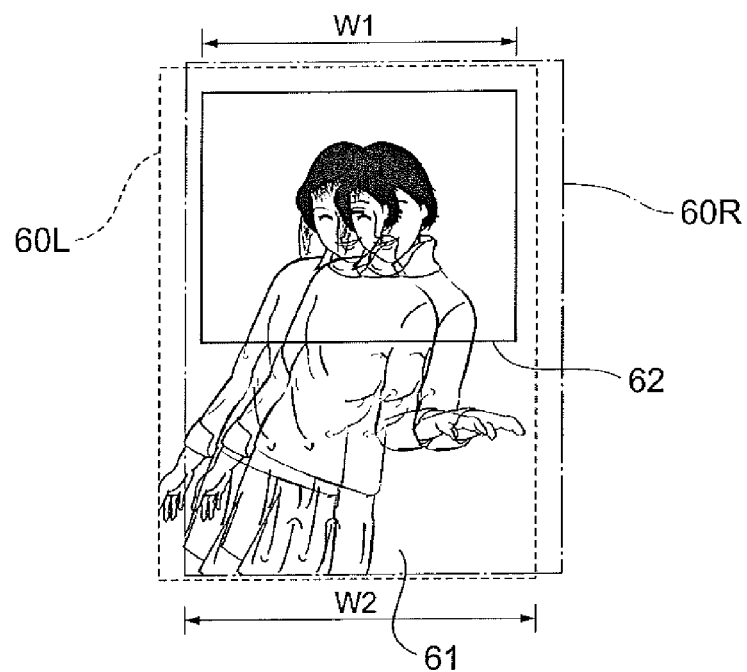
FIG. 4 illustrates an example of a stereoscopic image.
Figure 5:
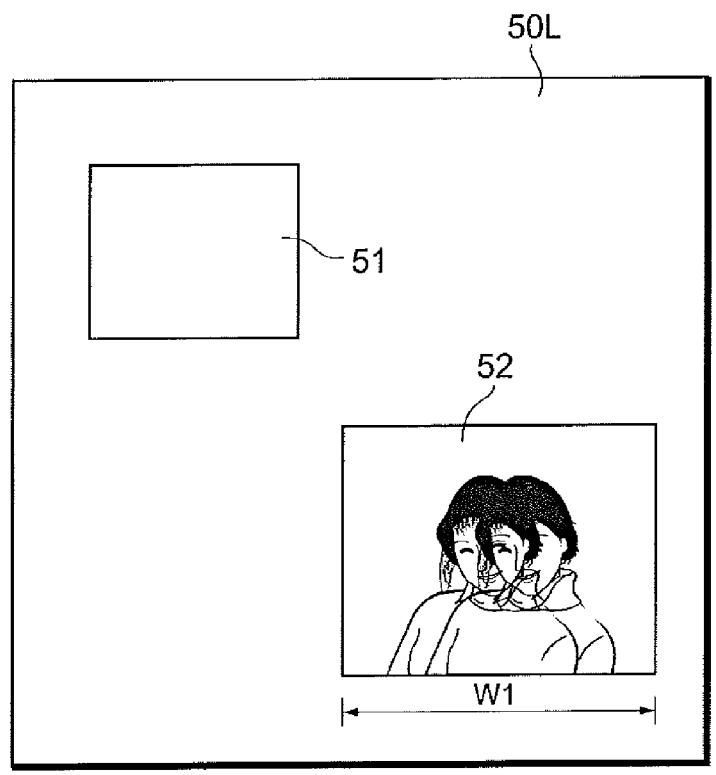
FIG. 5 is an example of a page constituting an electronic album.

FIG. 4 illustrates a stereoscopic image, and FIG. 5 illustrates the left-side page 50L in which the stereoscopic image shown in FIG. 4 is displayed.

If the left-eye image 60L and right-eye image 60R are superimposed upon being offset from each other in the horizontal direction (the amount of horizontal offset is the amount of parallax), then the observer can view a portion 61, where the two images have been superimposed, as a stereoscopic image. An image portion within a zone 62 contained in the superimposed image portion 61 and having the same size as that of the image compositing area 52 shown in FIG. 5 is displayed in the image compositing area 52. If we let w1 represent the transverse width of the image compositing area 52 and let w2 represent the transverse width of the superimposed image portion 61, then the transverse width w2 of the superimposed image portion 61 will be greater than the transverse width w1 of the image compositing area 52. The stereoscopic image is displayed within the image compositing area 52, therefore, without margins being produced in the image compositing area 52. In this embodiment, masking processing is applied to the background of the page other than the image compositing area in such a manner that the stereoscopic image will be displayed only within the image compositing area.

Figure 6:
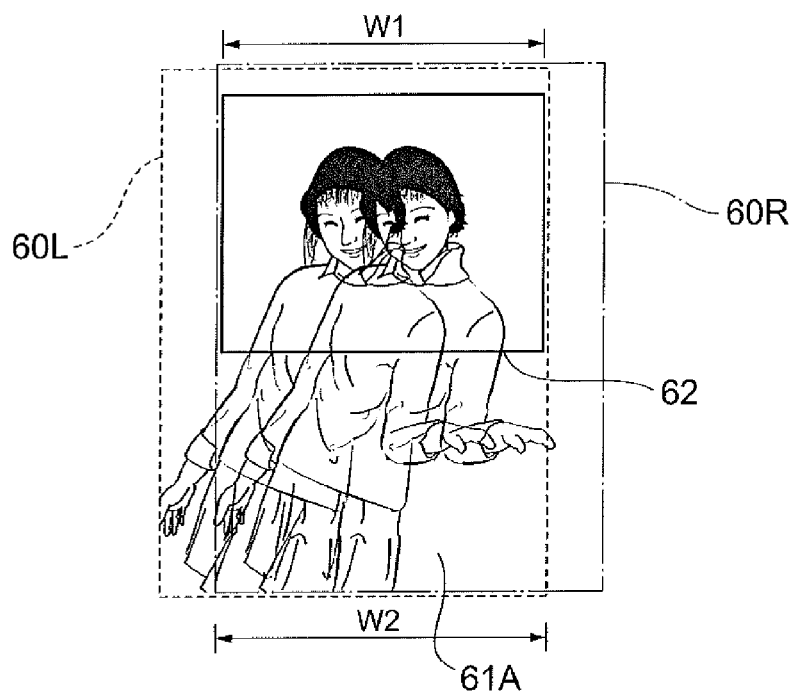
FIG. 6 illustrates an example of a stereoscopic image.
Figure 7:
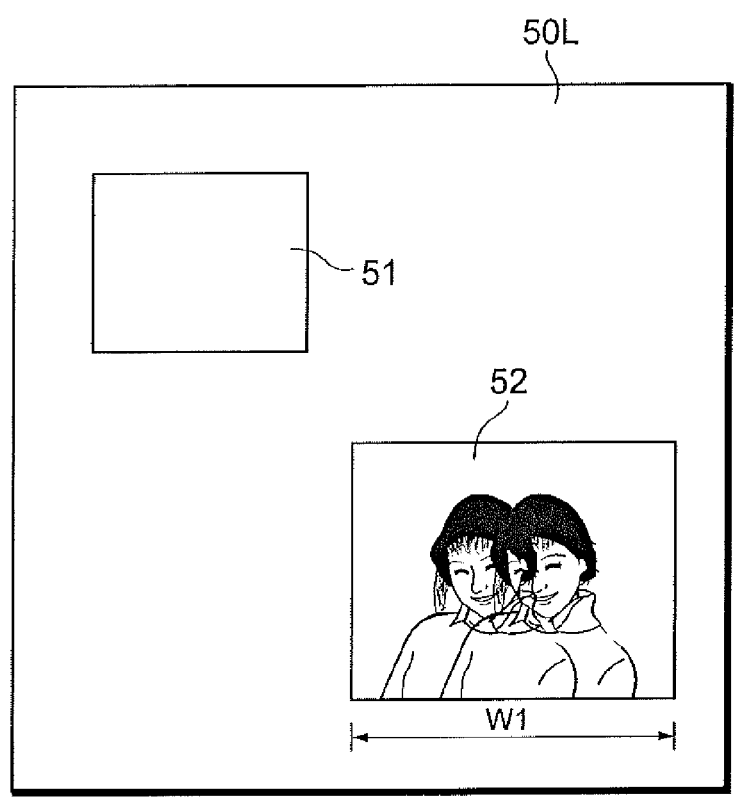
FIG. 7 is an example of a page constituting an electronic album.

FIG. 6 illustrates a stereoscopic image the amount of parallax of which has been enlarged, and FIG. 7 illustrates the left-side page 50L in which the stereoscopic image shown in FIG. 6 is displayed.

With reference to FIG. 6, the amount of parallax is enlarged when the left-eye image 60L is moved leftward and the right-eye image 60R is moved rightward. Even though the amount of parallax is enlarged, no margins will be produced in the image compositing area 52, as shown in FIG. 7, if the transverse width w2 of the portion 61 where the left-eye image 60L and right-eye image 60R are superimposed is greater than the transverse width w1 of the image compositing area 52.

Figure 8:
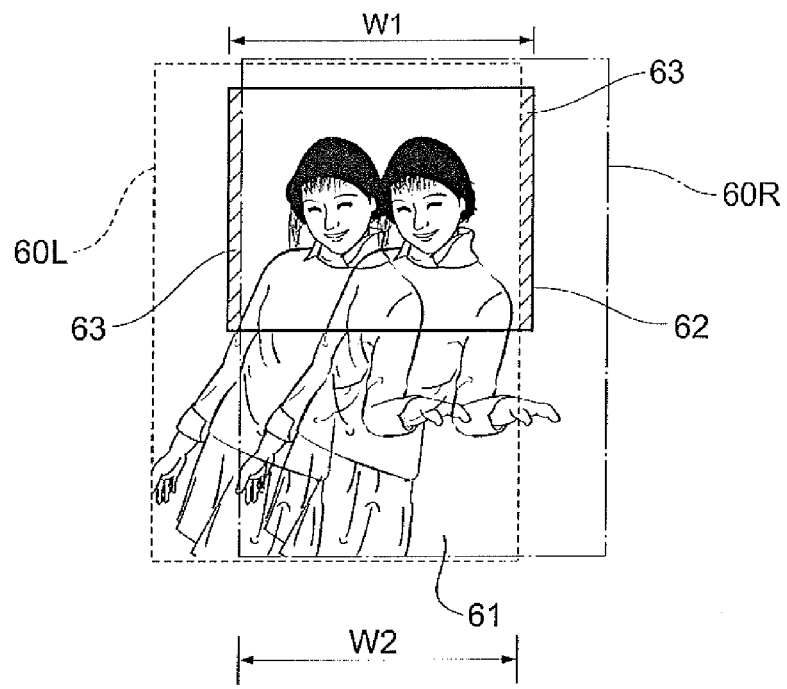
FIG. 8 illustrates an example of a stereoscopic image.
Figure 9:
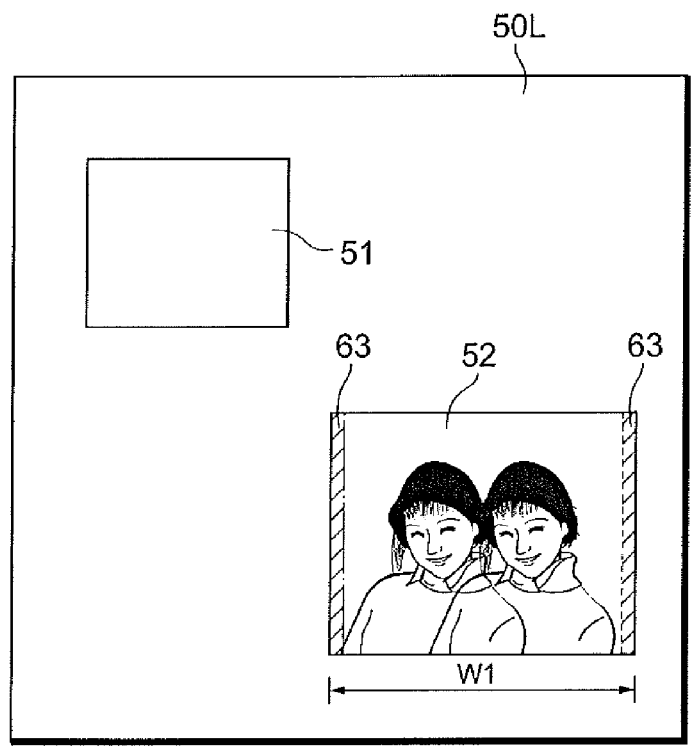
FIG. 9 is an example of a page constituting an electronic album.

FIG. 8 illustrates a stereoscopic image the amount of parallax of which has been enlarged further, and FIG. 9 illustrates the left-side page 50L in which the stereoscopic image shown in FIG. 8 is displayed.

With reference to FIG. 8, it is assumed here that the amount of parallax has been enlarged further and that the transverse width w2 of the portion 61 where the left-eye image 60L and right-eye image 60R are superimposed is less than the transverse width w1 of the image compositing area 52. In this case, both side edge portions (indicated by the hatching) 63 of the image inside the zone 62 protrude from the superimposed image portion 61. Since the hatched portions 63 are where only one image of the left-eye image 60L and right-eye image 60R exists, these portions do not form a stereoscopic image and both side edge portions 63 within the image compositing area 52 become margins, as illustrated in FIG. 9. When margins are produced inside the image compositing area 52, the layout of the page is disrupted. In this embodiment, therefore, the stereoscopic image (the left-eye image 60L and right-eye image 60R) is enlarged in size when margins will be produced.

Figure 10:
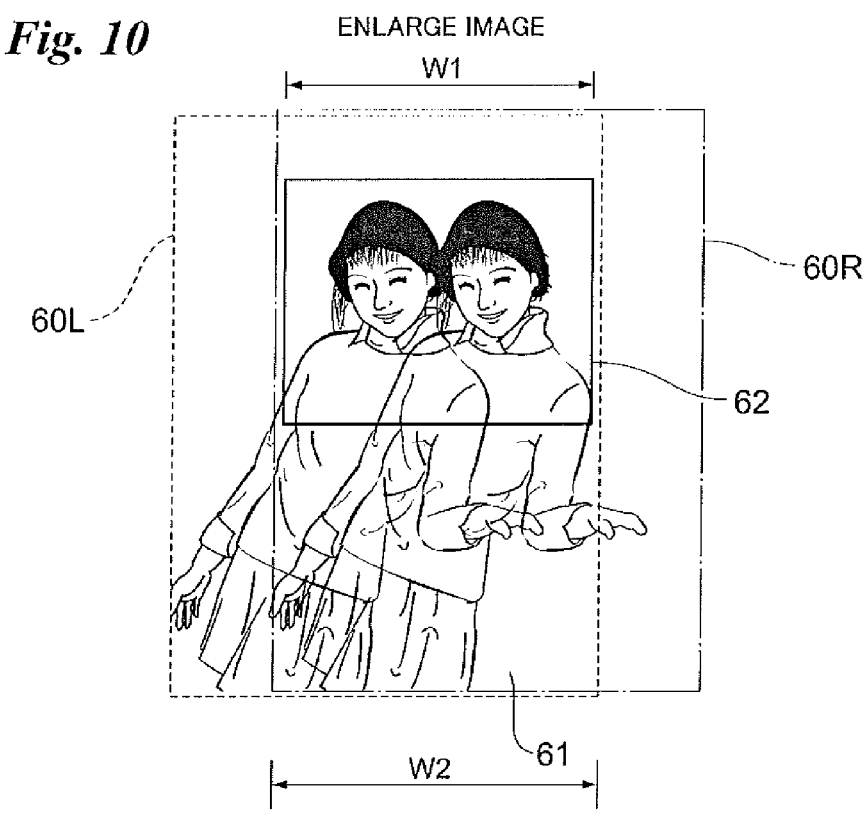
FIG. 10 illustrates an example of a stereoscopic image.
Figure 11:
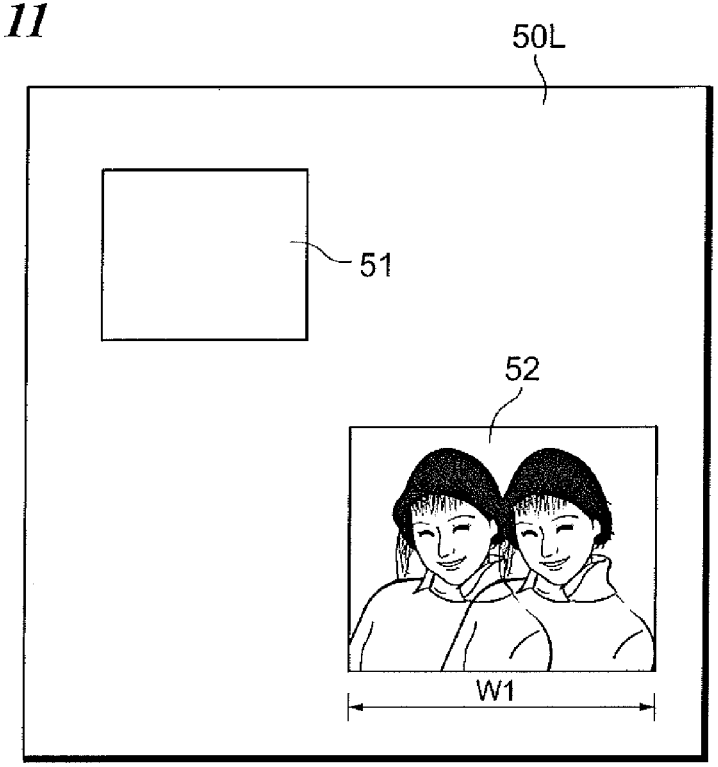
FIG. 11 is an example of a page constituting an electronic album.

FIG. 10 illustrates a stereoscopic image the amount of parallax of which has been enlarged, and FIG. 11 illustrates the left-side page 50L in which the stereoscopic image shown in FIG. 10 is displayed.

When the stereoscopic image (left-eye image 60L and right-eye image 60R) is enlarged in size, the transverse width w2 of the portion 61 where the left-eye image 60L and right-eye image 60R are superimposed also is enlarged. The transverse width w2 of the superimposed image portion 61, therefore, becomes larger than the transverse width w1 of the image compositing area 52. Margins are no longer produced in the image compositing area 52. Thus, in this embodiment, a stereoscopic image is enlarged in size in a case where margins will be produced in an image compositing area owing to an increase in amount of parallax.

Figure 12:
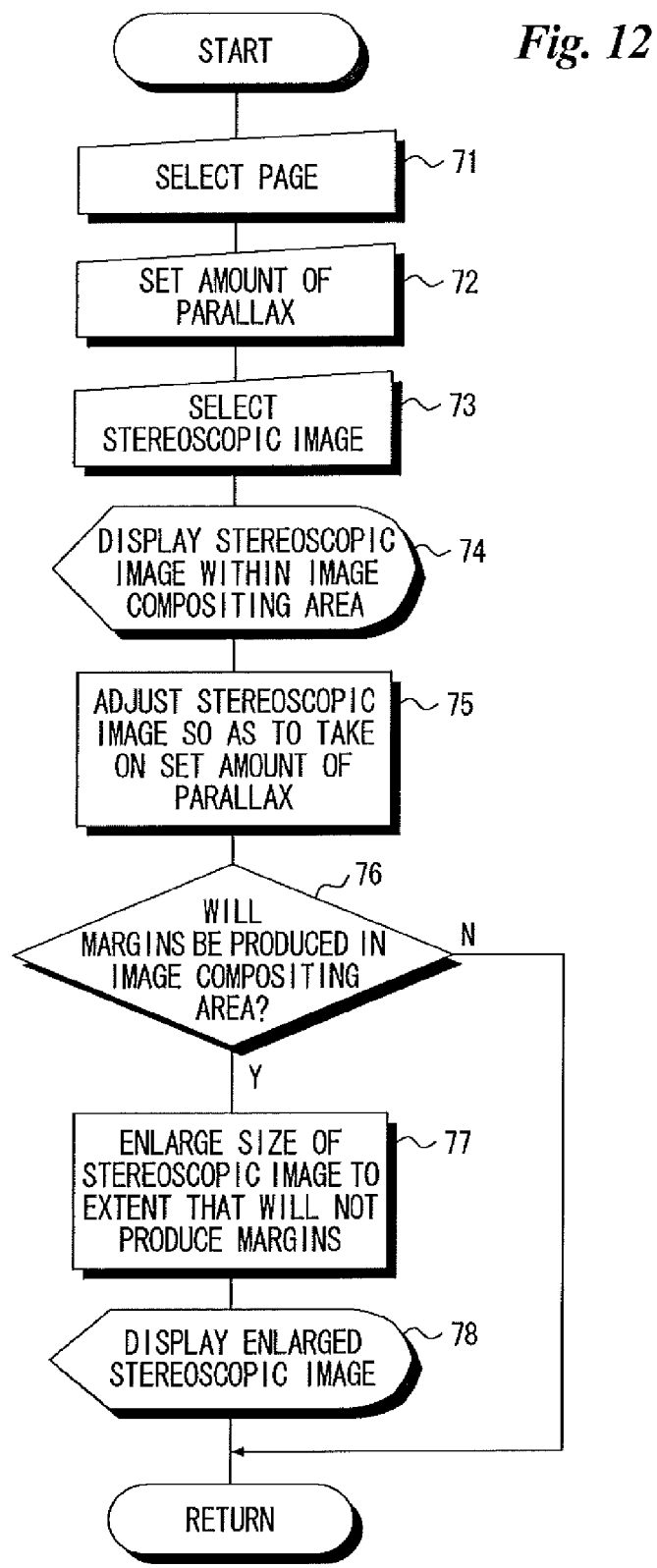
FIGS. 12 to 14 are flowcharts illustrating processing for generating an electronic album.

FIG. 12 is a flowchart illustrating processing for generating an electronic album.

An electronic album is selected and a page constituting this electronic album is selected by the user (step 71). Using the editing buttons 47, the user sets the amount of parallax of a stereoscopic image to be pasted on the page selected (step 72). For example, if a parallax-amount setting button among the editing buttons 47 is clicked, a parallax-amount adjusting window appears and the user uses this parallax-amount adjusting window to set a ratio with respect to the transverse width of the image compositing area. This ratio becomes the amount of parallax. The amount of parallax may be set for every page or for every image compositing area or may be made an amount of parallax that is common throughout the selected electronic album.

Next, the stereoscopic image to be pasted in the image compositing area is selected (step 73). When this is done, the selected stereoscopic image is displayed in, e.g., the image compositing area 52, as illustrated in FIG. 5 (step 74). At this time the stereoscopic image is displayed with an amount of parallax originally defined for the stereoscopic image. If an amount of parallax has not been defined for the stereoscopic image, then the stereoscopic image is displayed with a prescribed amount of parallax.

Next, the stereoscopic image is adjusted so as to have the amount of parallax set by the user (step 75). As a result, the stereoscopic image having the set amount of parallax is displayed in the image compositing area 52, etc., as shown in FIGS. 7, 9, etc. Whether margins will be produced in the image compositing area by adjusting the amount of parallax is checked (step 76).

If margins are produced in the image compositing area owing to enlargement of the amount of parallax ("YES" at step 76), as illustrated in FIGS. 8 and 9, then the stereoscopic image is enlarged in size to such an extent that margins will no longer be produced in the image compositing area, as illustrated in FIGS. 10 and 11 (step 77). The left-eye image 60L and the right-eye image 60R are enlarged in size until equality is achieved between the transverse width w1 of the image compositing area 52 and the transverse width w2 of the portion 61 of overlap between the left-eye image 60L and right-eye image 60R. The enlarged stereoscopic image is displayed as a result (step 78).

If margins are not produced in the image compositing area even though the amount of parallax is enlarged ("NO" at step 76), as shown in FIGS. 6 and 7, then the image enlargement processing indicated at step 77 is skipped.

It is thus possible to prevent margins from being produced in an image compositing area.

FIGS. 13 to 19 illustrate another embodiment.

This embodiment is such that in a case where an amount of parallax has been defined for an image compositing area, a stereoscopic image for which an amount of parallax close to the amount of parallax of the image compositing area has been defined is pasted in this image compositing area.

An electronic album is selected and a page constituting this electronic album is selected by the user (step 81).

Figure 15:
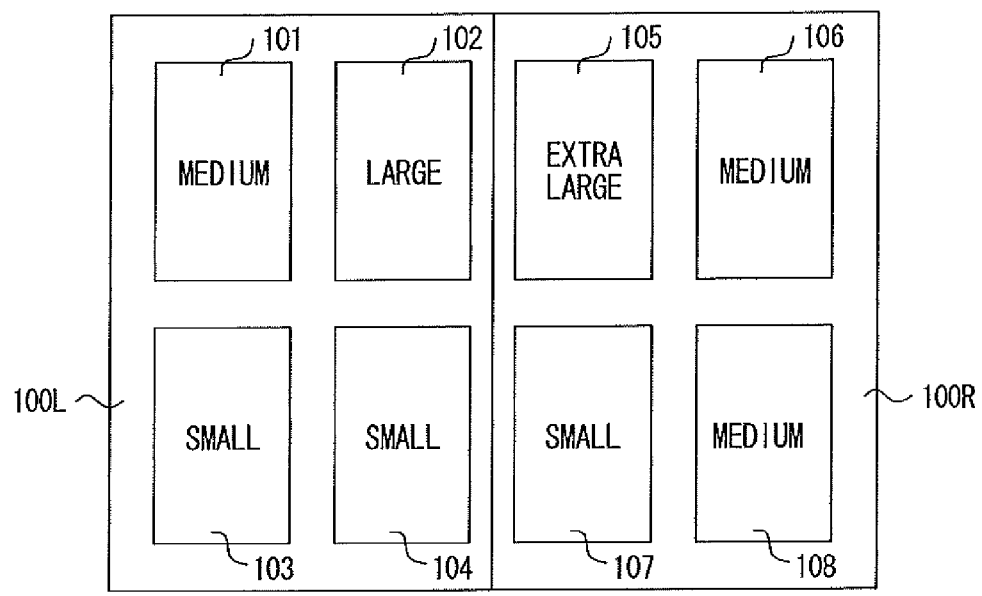
FIG. 15 is an example of a page constituting an electronic album.

FIG. 15 is an example of pages 100L and 100R that have been selected.

Image compositing areas 101, 102, 103 and 104 have been formed on the left-side page 100L. An amount of parallax has been defined for each of these image compositing areas 101, 102, 103 and 104. The characters reading "MEDIUM", "LARGE", "SMALL" and "SMALL" in the image compositing areas 101, 102, 103 and 104, respectively, represent the amounts of parallax of the respective image compositing areas 101, 102, 103 and 104. For example, "LARGE", "MEDIUM" and "SMALL" stipulate amounts of parallax that are 10%, 5% and 3%, respectively, of the transverse widths of the image compositing area.

Similarly, image compositing areas 105, 106, 107 and 108 have been formed on the right-side page 100R. Amounts of parallax "EXTRA LARGE", "MEDIUM, "SMALL" and "MEDIUM" have been defined for the image compositing areas 105, 106, 107 and 108, respectively. For example, "EXTRA LARGE" stipulates an amount of parallax that is 15% of the transverse width of the image compositing area.

The above-mentioned amounts of parallax have been recorded in the header of the image file representing the pages 100L and 100R. By reading data representing the amount of parallax of a desired image compositing area from the header, the amount of parallax of this image compositing area can be ascertained.

With reference again to FIG. 13, the number N of images (image compositing areas) on a selected page is detected (step 82). In the example shown in FIG. 15, the number of images is eight, which is obtained by adding the images on the left-side page 100L and right-side image 100R. However, the number of images on the left-side page 100L may be counted separately from the number on the right-side image 100R, giving four as the number of images.

If the number N of images is greater than zero ("YES" at step 83), then a desired image compositing area is selected and the amount of parallax that has been defined for this selected image compositing area is read (step 84).

From among stereoscopic images (which have been stored in a personal computer) to be pasted into the electronic album, an amount of parallax of a stereoscopic image for which an amount of parallax has not been defined is decided (step 85). Processing for deciding amount of parallax will be described in detail later. Naturally, an amount of parallax need not necessarily be decided with regard to a stereoscopic image for which an amount of parallax has not been defined. If processing for deciding amount of parallax is not executed with regard to a stereoscopic image for which an amount of parallax has not been defined, the processing of step 85 is skipped.

A stereoscopic image having an amount of parallax within a fixed range of the amount of parallax that has been read from the image compositing area is detected (step 86).

Figure 16:
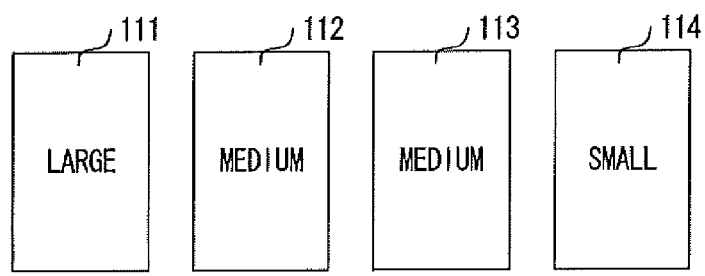
FIGS. 16 and 17 are examples of stereoscopic images.

FIG. 16 is an example of stereoscopic images.

Assume that stereoscopic images 111, 112, 113, 114 have been stored in a personal computer, and assume that amounts of parallax "LARGE", "MEDIUM", "MEDIUM" and "SMALL" have been defined for these stereoscopic images 111, 112, 113 and 114, respectively. By way of example, "LARGE", "MEDIUM" and "SMALL" are amounts of parallax that are 10%, 5% and 3%, respectively, of the transverse width of the stereoscopic images.

Figure 13:
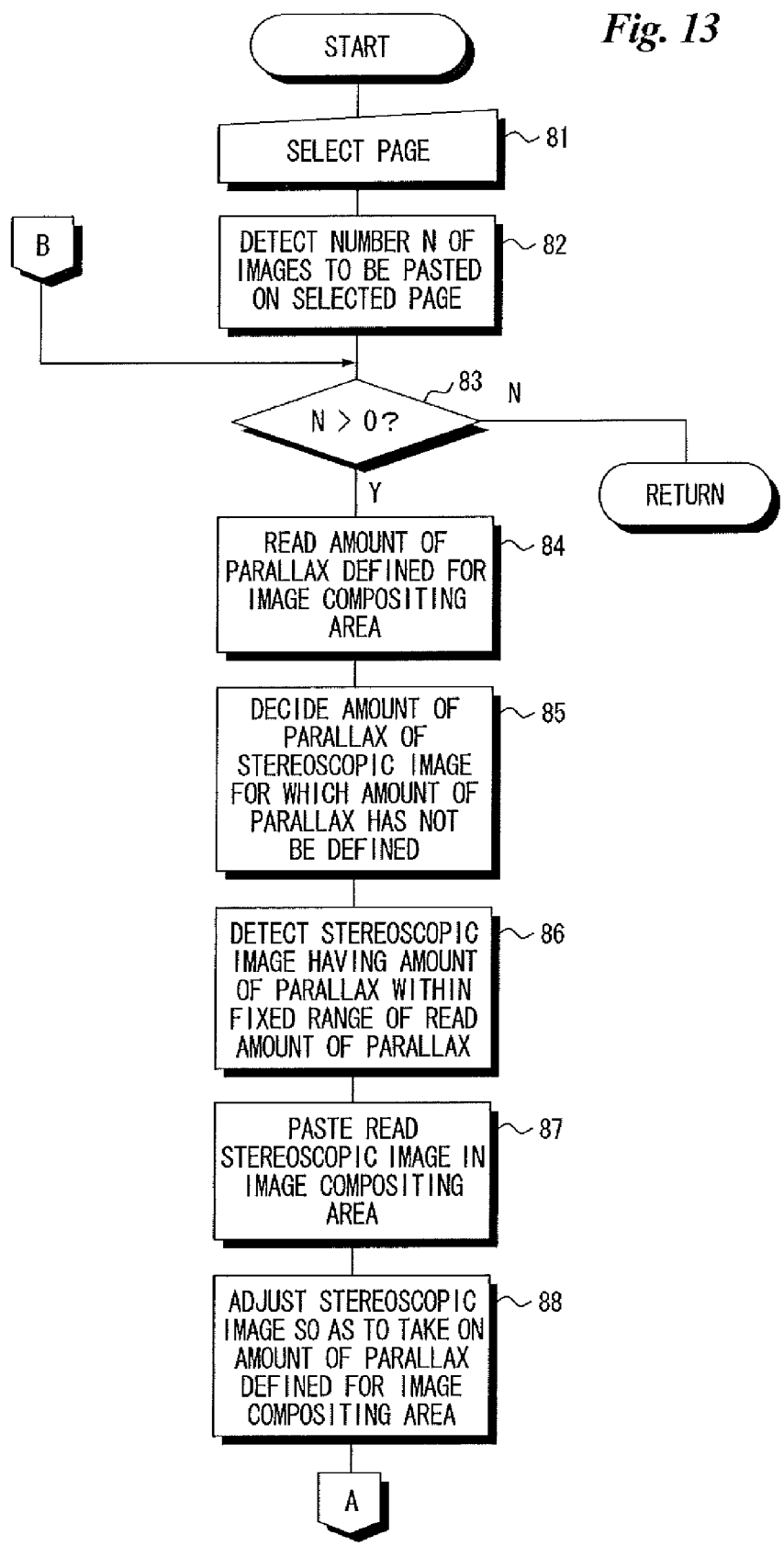
Figure 14:
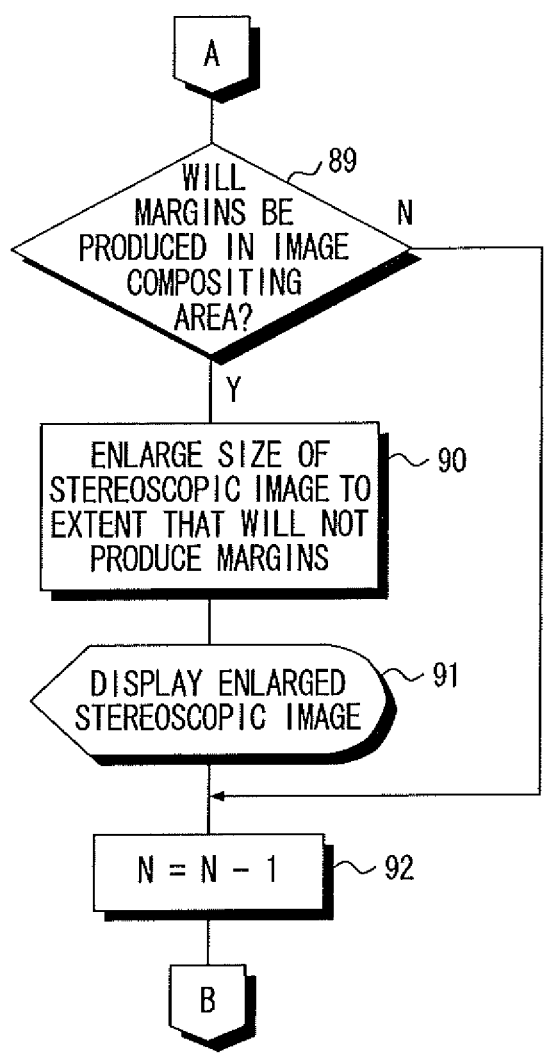

Among the stereoscopic images 111 to 114 shown in FIG. 16, a stereoscopic image having an amount of parallax close to the amounts of parallax of the image compositing areas 101 to 108 shown in FIG. 15 is pasted in the image compositing areas 101 to 108 (step 87 shown in FIG. 13). For example, the image 111 shown in FIG. 16 is pasted in the image compositing area 102 shown in FIG. 15, and the image 112 or 113 shown in FIG. 16 is pasted in any of the image compositing areas 101, 106, 108 shown in FIG. 16. The image 114 shown in FIG. 16 is pasted in any one of the image compositing areas 103, 104, 107 shown in FIG. 15. The stereoscopic images may be pasted in the image compositing areas giving priority to the left side or top side. Thus the image 112 is pasted in the image compositing area 101, the image 113 is pasted in the image compositing area 106 and the image 114 is pasted in the image compositing area 103.

If the amount of parallax that has been defined for a stereoscopic image that has been pasted in an image compositing area does not match the amount of parallax that has been defined for the image compositing area in which the stereoscopic image has been pasted, the stereoscopic image is adjusted in such a manner that its amount of parallax will become the amount of parallax defined for the image compositing area (step 88). For example, assume that the image compositing areas 103, 104, 107 for which the amount of parallax is "SMALL" do not exist on the pages 100L and 100R shown in FIG. 15, and that the stereoscopic image 114 shown in FIG. 16 is to be pasted in the image compositing area 108. In this case, the stereoscopic image 114 is adjusted so as to take on the amount of parallax of the image compositing area 108.

It is determined whether margins will be produced in the image compositing area owing to the fact that the stereoscopic image has been adjusted to an amount of parallax that has been defined for the image compositing area (step 89). If margins will be produced ("YES" at step 89), then, in the manner described above, the stereoscopic image is enlarged in size to such an extent that margins will no longer be produced (step 90). The enlarged stereoscopic image is displayed (step 91). If margins will not be produced in the image compositing area ("NO" at step 89), then the processing of steps 90 and 91 is skipped.

The number of images is decremented (step 92) and processing from step 83 onward is repeated.

Figure 17:
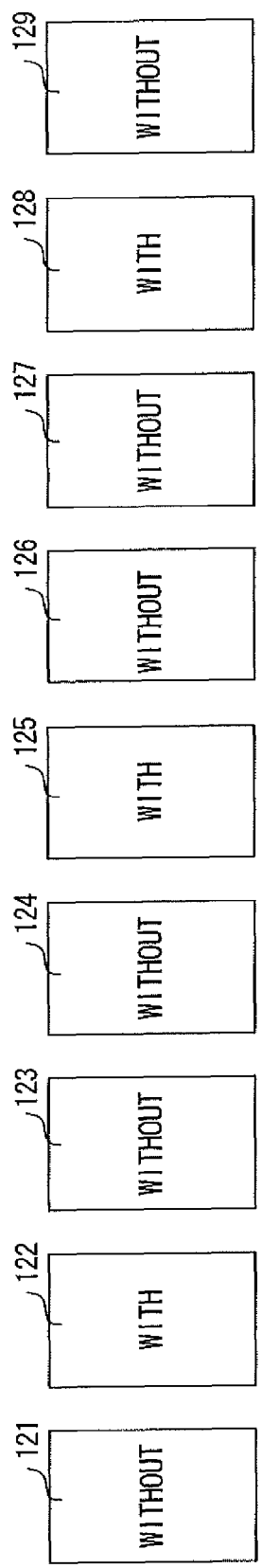

FIG. 17 is an example of stereoscopic images.

Among stereoscopic images 121 to 129, the stereoscopic images 121, 123, 124, 126, 127 and 129 marked "WITHOUT" do not have defined amounts of parallax. The stereoscopic images 122, 125, 128 marked "WITH" have defined amounts of parallax. Further, it is assumed that the stereoscopic images 121 to 129 are arranged in order of date and time of capture.

Figure 18:
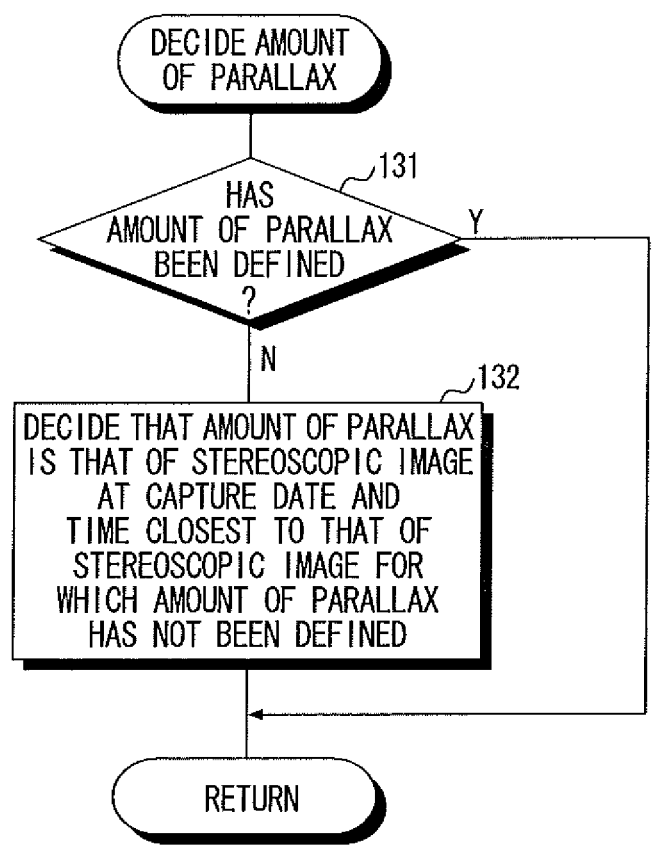
FIGS. 18 and 19 are flowcharts illustrating processing for deciding amount of parallax.

FIG. 18 is a flowchart illustrating processing for deciding amount of parallax (the processing of step 85 in FIG. 13).

First, it is determined whether an amount of parallax has been defined for a stereoscopic image (step 131). If an amount of parallax has been defined in the header of the image file representing the stereoscopic image, then determination processing is executed depending upon whether data representing the amount of parallax has been written to this header.

If an amount of parallax has not been defined for the stereoscopic image ("NO" at step 131), then the amount of parallax of the stereoscopic image whose date and time of capture is closest to the date and time of capture of the stereoscopic image for which an amount of parallax has not been defined is decided to be the amount of parallax of the stereoscopic image for which an amount of parallax has not been defined (step 132). For example, among the stereoscopic images 122, 125, 128 in FIG. 17 for which amounts of parallax have been defined, if the stereoscopic image whose date and time of capture is closest to the capture date and time of the stereoscopic image 123 is the stereoscopic image 122, then the amount of parallax of the stereoscopic image 123 is decided to be the amount of parallax of the stereoscopic image 122.

Figure 19:
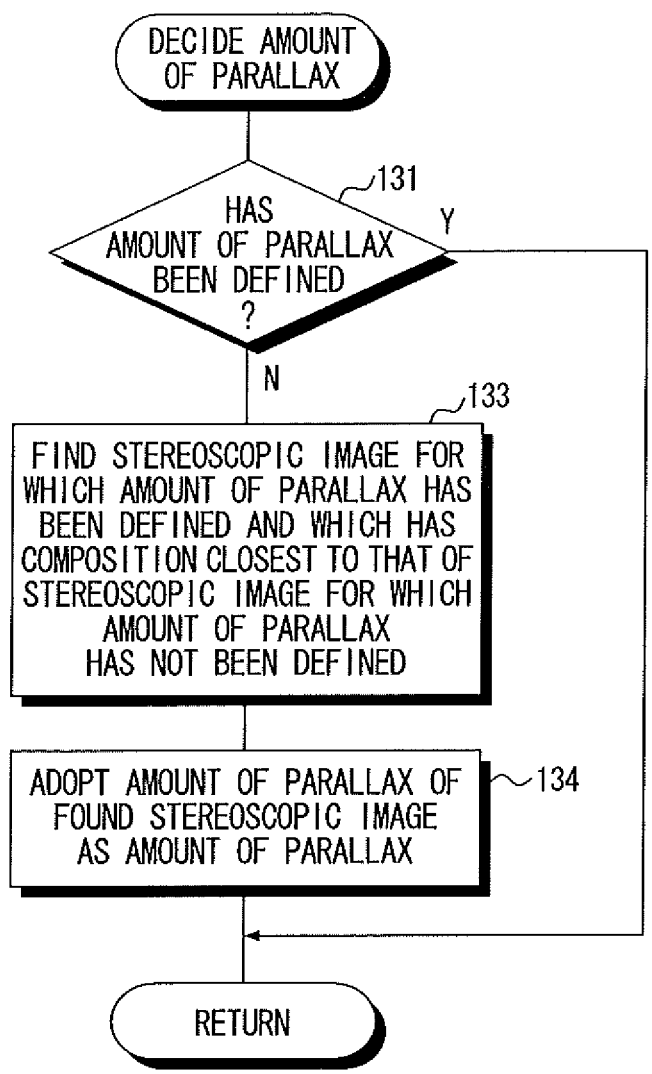

FIG. 19 is a flowchart illustrating other processing for deciding amount of parallax (the processing of step 85 in FIG. 13).

If an amount of parallax has not been defined for a stereoscopic image ("NO" at step 131), then a stereoscopic image for which an amount of parallax has been defined and which has a composition closest to that of the stereoscopic image for which an amount of parallax has not been defined is found (step 133). For example, in a case where an amount of parallax has been defined for a stereoscopic image in which the face of a person has been captured in large size at the center of the image, a stereoscopic image which has a composition identical with this composition and for which an amount of parallax has been defined is found. The amount of parallax that has been defined for the found stereoscopic image is decided to be the amount of parallax of the stereoscopic image for which an amount of parallax has not been defined (step 134). It goes without saying that face pattern matching can be utilized to determined whether compositions are similar or not.

The amount of parallax that has been defined for a stereoscopic image may be an amount stipulated by a stereoscopic digital camera at the time of image capture or an amount defined using a personal computer after image capture.

It may be so arranged that in a case where the user is permitted to set a fixed range of amounts of parallax and attempts to set an amount of parallax that is beyond this range, a prescribed amount of parallax within the fixed range is decided upon as the amount of parallax.

In the foregoing embodiment, it may be so arranged that an amount of parallax can be set for each individual page constituting an electronic album. In this case, a page would be designated by the editing buttons 47 and an amount of parallax would be input for every designated page by using the editing buttons 47.

Figure 20:
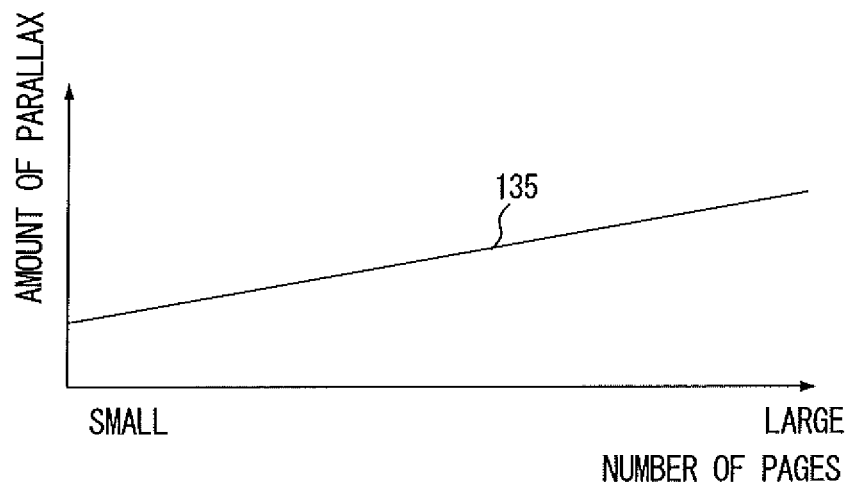
FIG. 20 is a graph representing amount of parallax and number of pages.

FIG. 20 is a graph 135 indicating the relationship between amount of parallax and number of pages.

The graph 135 indicates a relationship in which the amount of parallax of stereoscopic images increases as the pages of an album transition from the first half to the latter half of the album. An arrangement may be adopted in which the graph 135 indicating such a relationship between amount of parallax and number of pages is stored beforehand and the amount of parallax is set in accordance with the graph 135.

Figure 21:
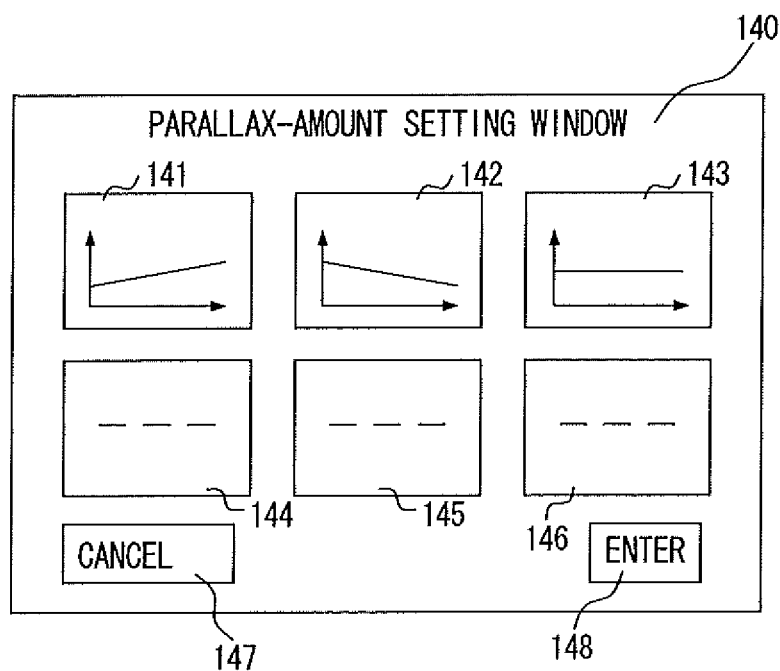
FIG. 21 is an example of a parallax-amount setting window.

FIG. 21 is an example of a window 140 for setting amount of parallax.

Graph windows 141 to 146 have been set in the parallax-amount setting window 140. Graphs indicating relationships between amount of parallax and number of pages have been defined for respective ones of the graph windows 141 to 146. Further, a cancel button 147 and an enter button 148 have been formed in the parallax-amount setting window 140.

From among the graph windows 141 to 146, the user selects the graph window (as by clicking on the graph window utilizing a mouse as the input unit 6) in which the graph that sets the desired amount of parallax has been defined. If the enter button 148 is then clicked, a per-page amount of parallax is set based upon the graph that has been defined in the graph window selected.

As many apparently widely different embodiments of the present invention can be made without departing from the spirit and scope thereof, it is to be understood that the invention is not limited to the specific embodiments thereof except as defined in the appended claims.

What is claimed is:

1. A stereoscopic image display control apparatus comprising:
    a selecting device for selecting a stereoscopic image to be pasted in a pasting area that has been formed in a template;
    a pasting device for pasting at least part of a superimposed image portion, which is obtained by superimposing a left-eye image and a right-eye image that constitute the stereoscopic image that has been selected by said selecting device, in the pasting area so as not to protrude from the pasting area;
    a parallax-amount setting device for setting a parallax amount of the stereoscopic image;
    a parallax-amount adjusting device for adjusting the parallax amount of the stereoscopic image, which has been pasted in the pasting area by said pasting device, to the parallax amount set by said parallax-amount setting device;
    a determination device for determining whether margins will be produced in the pasting area owing to adjustment of the parallax amount by said parallax-amount adjusting device; and
    a display control device for controlling a display unit so as to enlarge the stereoscopic image in size and display the stereoscopic image inside the pasting area in response to a determination by said determination device that margins will be produced in the pasting area.

2. The apparatus according to claim 1, wherein an amount of parallax has been defined for the pasting area; and
    said selecting device selects a stereoscopic image having a parallax amount within a fixed range of the parallax amount that has been defined for the pasting area.

3. The apparatus according to claim 1, wherein a parallax amount of a stereoscopic image for which a parallax amount has not been defined is made a parallax amount of a stereoscopic image having the most recent capture date and time or a parallax amount of a stereoscopic image having the closest resembling composition from among stereoscopic images for which parallax amounts have been defined.

4. The apparatus according to claim 1, wherein the template is a plurality of pages constituting an electronic album; and
    said parallax-amount setting device sets a parallax amount on a page-by-page basis.

5. The apparatus according to claim 1, wherein said parallax-amount setting device sets a parallax amount in such a manner that the parallax amount of stereoscopic images increases as pages transition from album pages of a first half to album pages of a latter half.

6. The apparatus according to claim 4, wherein a plurality of graphs representing relationships between pages and amounts of parallax have been stored; and
    said parallax-amount setting device sets a parallax amount by selecting one graph from among the plurality of graphs.

7. A method of controlling operation of a stereoscopic image display control apparatus, comprising the steps of:
    selecting a stereoscopic image to be pasted in a pasting area that has been formed in a template;
    pasting at least part of a superimposed image portion, which is obtained by superimposing a left-eye image and a right-eye image that constitute the stereoscopic image that has been selected, in the pasting area so as not to protrude from the pasting area;
    setting a parallax amount of the stereoscopic image;

adjusting the parallax amount of the stereoscopic image, which has been pasted in the pasting area, to the parallax amount that has been set;

determining whether margins will be produced in the pasting area owing to adjustment of the parallax amount; and controlling a display unit so as to enlarge the stereoscopic image in size and display the stereoscopic image inside the pasting area in response to a determination that margins will be produced in the pasting area.

8. A computer-readable program recorded on a non-transitory computer-readable medium for controlling a computer of a stereoscopic image display control apparatus so as to:

select a stereoscopic image to be pasted in a pasting area that has been formed in a template;

paste at least part of a superimposed image portion, which is obtained by superimposing a left-eye image and a right-eye image that constitute the stereoscopic image that has been selected, in the pasting area so as not to protrude from the pasting area;

set a parallax amount of the stereoscopic image;

adjust the parallax amount of the stereoscopic image, which has been pasted in the pasting area, to the parallax amount that has been set;

determine whether margins will be produced in the pasting area owing to adjustment of the parallax amount; and control a display unit so as to enlarge the stereoscopic image in size and display the stereoscopic image inside the pasting area in response to a determination that margins will be produced in the pasting area.

* * * * *